United States Patent
Herman et al.

(10) Patent No.: US 10,829,091 B2
(45) Date of Patent: Nov. 10, 2020

(54) VEHICLE SENSOR CLEANING

(71) Applicant: Ford Global Technologies, LLC, Dearborn, MI (US)

(72) Inventors: David Michael Herman, Oak Park, MI (US); Sunil Patil, Troy, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 180 days.

(21) Appl. No.: 16/136,629

(22) Filed: Sep. 20, 2018

(65) Prior Publication Data

US 2020/0094784 A1    Mar. 26, 2020

(51) Int. Cl.
| | |
|---|---|
| *B60S 1/08* | (2006.01) |
| *G02B 27/00* | (2006.01) |
| *B60S 1/56* | (2006.01) |
| *H04N 5/217* | (2011.01) |
| *G06K 9/00* | (2006.01) |
| *G06T 7/00* | (2017.01) |

(52) U.S. Cl.
CPC ............ *B60S 1/0848* (2013.01); *B60S 1/56* (2013.01); *G02B 27/0006* (2013.01); *B60R 2300/804* (2013.01); *B60R 2300/806* (2013.01); *G06K 9/00805* (2013.01); *G06T 7/0002* (2013.01); *G06T 2207/30168* (2013.01); *H04N 5/2171* (2013.01)

(58) Field of Classification Search
CPC ...... B60S 1/0848; B60S 1/56; G02B 27/0006; B60R 2300/806; B60R 2300/804; H04N 5/2171; G06T 2207/30168; G06T 7/0002; G06K 9/00805
See application file for complete search history.

(56) References Cited

U.S. PATENT DOCUMENTS

| | | |
|---|---|---|
| 6,198,852 B1 | 3/2001 | Anadan et al. |
| 7,609,857 B2 | 10/2009 | Franz |
| 8,553,088 B2 | 10/2013 | Stein et al. |
| 8,797,417 B2 | 8/2014 | Gayko et al. |
| 8,861,780 B2 | 10/2014 | Heenan et al. |
| 9,126,534 B2 | 9/2015 | Snider |
| 9,185,360 B2 | 11/2015 | Stein et al. |

(Continued)

FOREIGN PATENT DOCUMENTS

| | | | |
|---|---|---|---|
| CN | 107150662 A | * 9/2017 | ................ B60S 1/08 |
| CN | 107605537 A | 1/2018 | |

(Continued)

OTHER PUBLICATIONS

Cordts et al., "The Cityscapes Dataset for Semantic Urban Scene Understanding", www.cityscapes-dataset.net, arXiv:1604.016085v2, Apr. 7, 2016.

(Continued)

*Primary Examiner* — Marthe Y Marc-Coleman

(74) *Attorney, Agent, or Firm* — Frank A. MacKenzie; Bejin Bieneman PLC

(57) ABSTRACT

A system includes a processor and a memory. The memory stores instructions executable by the processor to detect an occlusion on a surface in a vehicle sensor optical path based on a segmentation of sensor image data, and to select a cleaning plan for the surface based on the detected occlusion, map data, and vehicle route data.

20 Claims, 10 Drawing Sheets

(56) References Cited

U.S. PATENT DOCUMENTS

| | | |
|---|---|---|
| 9,224,055 B2 | 12/2015 | Kido |
| 9,445,057 B2 | 9/2016 | May et al. |
| 9,607,242 B2 | 3/2017 | Lavoie |
| 9,804,386 B2 | 10/2017 | Hayakawa et al. |
| 2008/0079835 A1 | 4/2008 | Lin |
| 2012/0026326 A1 | 2/2012 | Itoh et al. |
| 2015/0088374 A1 | 3/2015 | Yopp et al. |
| 2015/0310274 A1 | 10/2015 | Shreve et al. |
| 2015/0343999 A1* | 12/2015 | Lopez Galera ........... B60S 1/56 134/30 |
| 2015/0356371 A1 | 12/2015 | Libal et al. |
| 2016/0176384 A1* | 6/2016 | Dissette ................ G01S 7/4004 134/34 |
| 2017/0076463 A1 | 3/2017 | Nishijima |
| 2017/0109590 A1 | 4/2017 | Cehrke |
| 2017/0253201 A1 | 9/2017 | Maeshiro |
| 2018/0143298 A1* | 5/2018 | Newman ........... G01C 21/3492 |
| 2018/0200745 A1 | 7/2018 | Dudar |
| 2018/0334140 A1 | 11/2018 | Channam et al. |
| 2018/0341270 A1 | 11/2018 | Dudar |
| 2019/0064810 A1 | 2/2019 | Jiang et al. |
| 2019/0322245 A1* | 10/2019 | Kline ..................... B60S 1/0848 |
| 2019/0385025 A1* | 12/2019 | McMichael .......... G06K 9/6272 |
| 2020/0001832 A1* | 1/2020 | Deane ...................... B08B 3/02 |

FOREIGN PATENT DOCUMENTS

| | | |
|---|---|---|
| DE | 4128039 A1 | 2/1993 |
| DE | 10322087 A1 | 12/2004 |
| WO | 2010038223 A1 | 4/2010 |
| WO | 2017153372 A1 | 9/2017 |

OTHER PUBLICATIONS

Dodge et al., "Understanding How Image Quality Affects Deep Neural Networks", arXiv:1604.04004v2, Apr. 21, 2016.

Everingham et al., "The Pascal Visual Object Classes Challenge: A Retrospective", Int. J. Comput. Vis. (2015) 111:98-136; DOI 10.1007/s11263-014-0733-5.

Megahed et al., "A Review and Perspective on Control Charting with Image Data", Journal of Quality Technology 43 (2):83-98 — Apr. 2011.

Zhang et al., "Self-detection of optical contamination or occlusion in vehicle vision systems", Optical Engineering 47(6), 067006 (Jun. 1, 2008). https://doi.org/10.1117/1.2947578.

Zoox Fully Autonomous Driving, https://youtu.be/868tExoVdQw?t=177 (published on Jul. 20, 2018).

Cordts et al., "The Stixel World: A Medium-Level Representation of Traffic Scenes", arXiv:1704.00280v1, Apr. 2, 2017.

Li et al., "Lecture 3—Loss Functions and Optimization", https://www.youtube.com/watch?v=h7iBpEHGVNc&feature=youtu.be&list=PL3FW7Lu3i5JvHM8ljYj-zLfQRF3EO8sYv&t=4031.

Non-Final Office Action dated May 1, 2020 re U.S. Appl. No. 16/136,631, filed Sep. 20, 2018.

Notice of Allowance dated Sep. 18, 2020; U.S. Appl. No. 16/136,631.

* cited by examiner

VEHICLE SENSOR CLEANING

BACKGROUND

Safe and comfortable operation of a vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway. A vehicle may include one or more optical or image sensors such as camera sensors. Typically, such sensors include transparent surfaces, e.g., lenses, to protect an imaging sensor viewing an area outside of the vehicle and/or to focus incoming light beams on the imaging sensor. A transparent surface such as a camera lens is typically subject to environmental conditions, e.g., dust, smudge, rain, fog, etc., that can impair visibility of the vehicle exterior. Further, an optical property of a transparent surface such as a lens may change due to degradation or damage, e.g., scratching, pitting, etc.

DETAILED DESCRIPTION

Introduction

Figure 1:
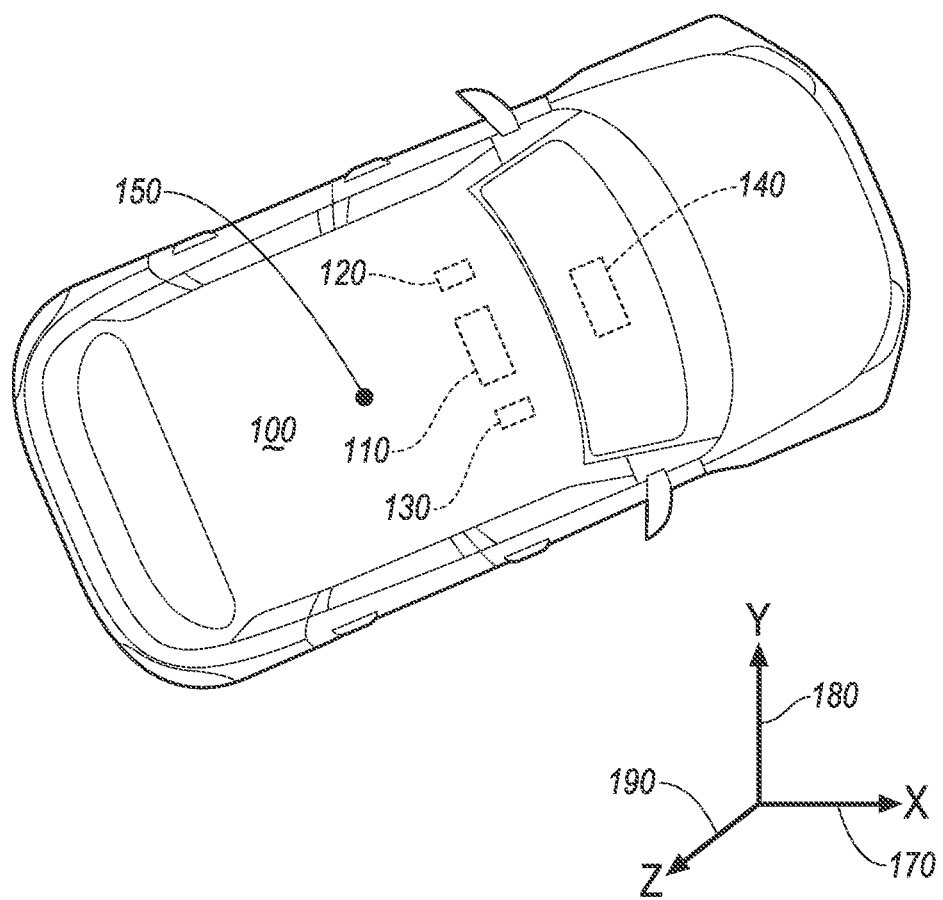
FIG. 1 is a block diagram illustrating an example vehicle.

Disclosed herein is a system including a processor and a memory. The memory stores instructions executable by the processor to detect an occlusion on a surface in a vehicle sensor optical path based on a segmentation of sensor image data, and to select a cleaning plan for the surface based on the detected occlusion, map data, and vehicle route data.

The instructions may further include instructions to perform the segmentation of the sensor image data based on output of a neural network trained to detect a plurality of feature classes including at least an occlusion class.

The plurality of feature classes may further include at least one of a road, a pedestrian, a car, a building, a vegetation, and a sky class.

The surface may include at least one of a lens, a transparent cover, and a part of a vehicle windshield.

The instructions may further include instructions to determine a predicted segmentation class of a location including one or more points on an exterior of the surface based on the sensor field of view, the vehicle route data, and the map data, and determine a priority of the point based at least in part on the predicted segmentation class.

The selected cleaning plan may further include a time of actuation of a vehicle cleaning actuator and a predicted duration of cleaning.

The instructions may further include instructions to determine a location of the occlusion on an exterior of the surface, to predict a change of priority of the location on the exterior surface based on the vehicle route, and to plan the time of cleaning based on the predicted change of the priority and a vehicle speed.

The instructions may further include instructions to select a priority threshold for cleaning based on the vehicle speed, and upon determining that the priority of the location on an exterior of the sensor exceeds the selected priority threshold, to actuate a vehicle cleaning actuator to clean the exterior of the surface.

The instructions may further include instructions to determine a cleaning score based on a priority of a location of the occlusion, a vehicle speed, a number of occluded pixels in the image data, and a predicted duration of a cleaning, and select the cleaning plan based on the determined score.

The instructions may further include instructions to perform the selected cleaning plan.

The selected cleaning plan may further include at least one of a time of actuating a cleaning actuator, a duration of actuation, and a mode of operating the cleaning actuator.

The instructions to perform the selected cleaning plan may further include instructions to activate the cleaning actuator at the time of actuating the cleaning actuator for the duration of actuation.

The instructions may further include instructions to determine normalized scores from start to end of a vehicle route, determine a time of maximum normalized score, and to determine the time of actuating the cleaning actuator based on the time of a maximum normalized score.

Further disclosed herein is a system including a vehicle camera sensor having an optical path, and a processor that is programmed to detect an occlusion on a surface in the optical path of the vehicle camera sensor based on a segmentation of sensor image data, and to select a cleaning plan for the surface based on the detected occlusion, map data, and vehicle route data.

The processor may be further programmed to perform the segmentation of the sensor image data based on output of a neural network trained to detect a plurality of feature classes including at least an occlusion class.

The processor may be further programmed to determine a predicted segmentation class of a location including one or more points on an exterior of the surface based on the sensor field of view, the vehicle route data, and the map data, and to determine a priority of the point based at least in part on the predicted segmentation class.

Further disclosed herein is a method including detecting an occlusion on a surface in the optical path of the vehicle camera sensor based on a segmentation of sensor image data, and selecting a cleaning plan for the surface based on the detected occlusion, map data, and vehicle route data.

The method may further include performing the segmentation of the sensor image data based on output of a neural network trained to detect a plurality of feature classes including at least an occlusion class.

The method may further include determining a predicted segmentation class of a location including one or more points on an exterior of the surface based on the sensor field of view, the vehicle route data, and the map data, and determining a priority of the point based at least in part on the predicted segmentation class.

The method may further include performing the selected cleaning plan.

Further disclosed is a computing device programmed to execute any of the above method steps.

Yet further disclosed is a computer program product, comprising a computer readable medium storing instructions executable by a computer processor, to execute any of the above method steps.

System Elements

An occluded area (or occlusion) on a surface in a vehicle sensor optical path may be detected based on a semantic segmentation of sensor image data. A cleaning plan for the surface may be selected based on the detected occlusion, map data, vehicle route data. An occlusion on a vehicle sensor, e.g., on a lens, may impair an ability of vehicle computer to detect object(s) based on the received sensor data, and therefore may impair an ability of the vehicle computer to operate the vehicle. Thus, the present system improves vehicle operation by detecting and/or remediating an occluded area of a vehicle sensor transparency, e.g., a lens. In the context of this disclosure, "occluded" with respect to a transparent surface such as a lens means a blockage that prevents or diminishes the passage of light. In the present context, "diminishing the passage of light" means attenuating (reducing) and/or manipulating (e.g., scattering translucence) light while passing through. In the present context, "reducing" means a decrease of light intensity because of passing through the occluded area, e.g., rain drop. Translucence is a physical property of allowing light to pass through a material diffusely. In addition, the blockage may result in a shift in perceived color of the environment from a transparent colored film. Additionally or alternatively, a blockage may result in a blurring of image or a localized distortion.

FIG. 1 shows an example vehicle 100 which may include a computer 110, actuator(s) 120, sensors 130 such as a (Light Detection and Ranging) lidar sensor 130, camera sensor 130, GPS sensor 130, radar sensor 130, camera sensor 130, etc., and a human machine interface (HMI 140). A vehicle 100 may be powered in variety of ways, e.g., including with an electric motor and/or internal combustion engine. A vehicle 100 may include a reference point 150, e.g., an intersection of a vehicle 100 longitudinal and lateral axes (the axes can define respective longitudinal and lateral center lines of the vehicle 100 so that the reference point 150 may be referred to as a vehicle 100 center point). In the present context, a vehicle 100 location refers to location coordinates of the vehicle 100 reference point 150.

FIG. 1 further shows a first coordinate system defined by an X axis 170, Y axis 180, and Z axis 190, e.g., a Cartesian coordinate system, that is independent from the vehicle 100 location and/or orientation. The first coordinate system may be referred to as a "global" coordinate system because it is defined independently of a vehicle 100 and is typically defined for a geographic area, such as the coordinate system of a global positioning system (GPS) that is defined for the world. Alternatively or additionally, the first coordinate system could include any other location coordinate system providing geo-coordinates (i.e., latitude, longitude pairs) or the like.

The computer 110 includes a processor and a memory. The memory includes one or more forms of computer-readable media, and stores instructions executable by the computer 110 for performing various operations, including as disclosed herein.

The computer 110 may operate the vehicle 100 in an autonomous, semi-autonomous, or non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering; in a non-autonomous mode, a human operator controls vehicle propulsion, braking, and steering.

The computer 110 may include programming to operate one or more of vehicle brakes, propulsion (e.g., control of acceleration in the vehicle 100 by controlling one or more of an internal combustion engine, electric motor, hybrid engine, cleaning actuator 120, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle 100 and/or receive messages from the various devices, e.g., the sensor 130, actuators 120, etc. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle 100 communication network.

The vehicle 100 actuators 120 may be implemented via circuits, chips, or other electronic components that can actuate various vehicle subsystems in accordance with appropriate control signals as is known. The actuators 120 may be used to control braking, acceleration, and steering of the vehicle 100. As an example, the vehicle 100 computer 110 may output control instructions to control the actuators 120.

In addition, the computer 110 may be programmed to communicate through a wireless communication network with, e.g., a remote computer. The wireless communication network, which may include a Vehicle-to-Vehicle (V-to-V) and/or a Vehicle-to-Infrastructure (V-to-I) communication network, includes one or more structures by which the vehicles 100, the remote computer, etc., may communicate with one another, including any desired combination of wireless (e.g., cellular, wireless, satellite, microwave and radio frequency) communication mechanisms and any desired network topology (or topologies when a plurality of communication mechanisms are utilized). Exemplary V-to-V or V-to-I communication networks include cellular, Bluetooth, IEEE 802.11, dedicated short range communications (DSRC), and/or wide area networks (WAN), including the Internet, providing data communication services.

Figures 2A, 2B:
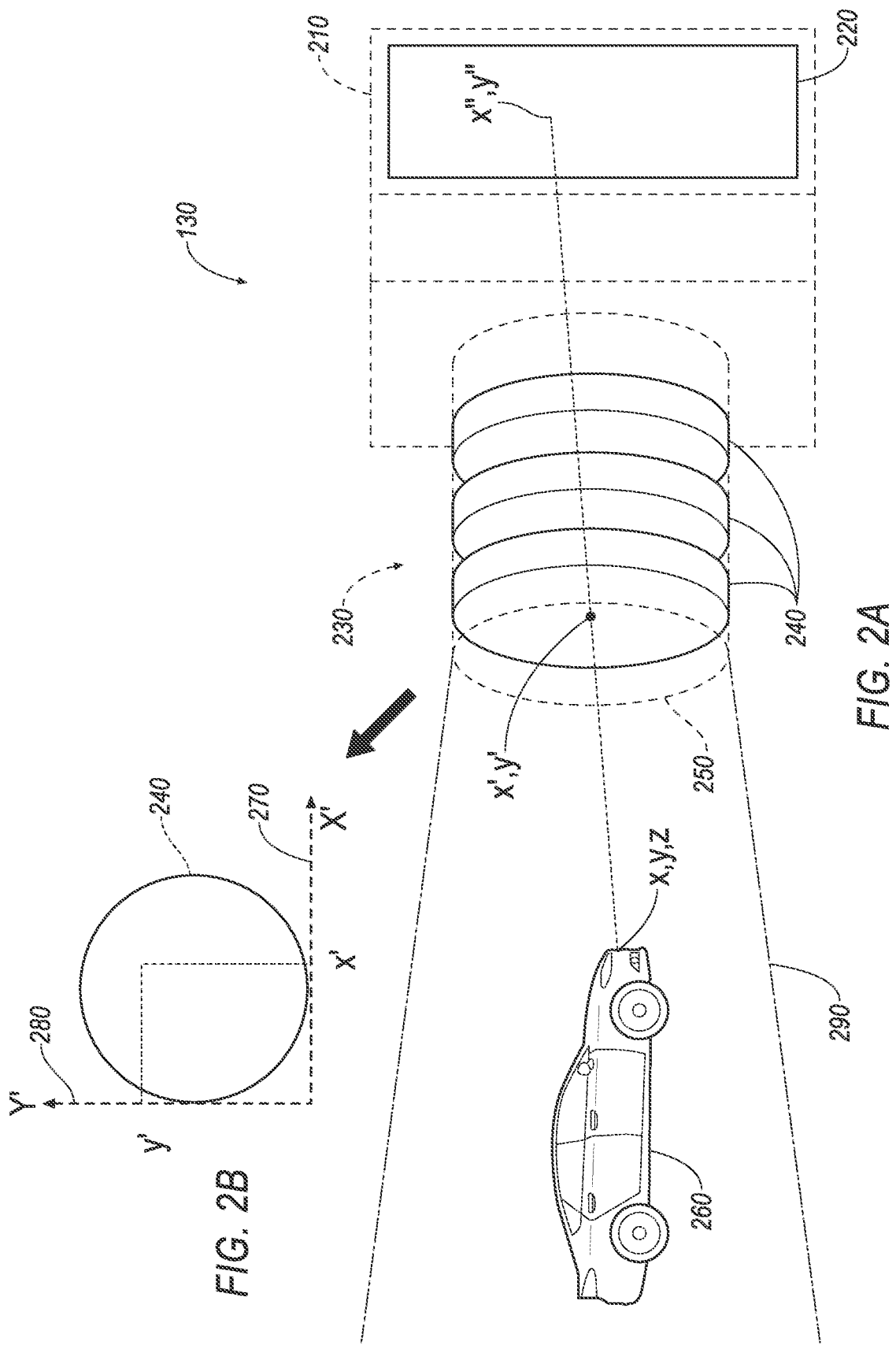
FIG. 2A is a diagram showing an example camera sensor and an object viewed by the vehicle sensor.
FIG. 2B is a diagram showing a front view of a lens of the camera of FIG. 2A.

The vehicle 100 may include one or more sensor(s) 130 that provide data from detecting physical phenomena (e.g., light, sound, electricity, magnetism, etc.) from spaces encompassing at least some of an interior and/or exterior of the vehicle 100. With reference to FIGS. 1 and 2A-2B, a vehicle 100 may include one or more camera object detection sensor(s) 130, e.g., lidar, radar, and/or camera sensor 130. A camera sensor 130 may provide image data from an area within a field of view 290 of the camera sensor 130. A camera sensor 130 may include a housing 210, an image sensor 220, and an optical path 230. The camera sensor 130 may receive light beams from an area within the field of view 290 of the sensor 130 and may generate an electrical signal based on the received light beams, e.g., in a conventional manner. The housing 210 may be formed of plastic, metal, etc., that encloses components of the camera sensor 130. The image sensor 220 may include an electronic receiver, e.g., a charge-coupled device (CCD) or Complementary metal-oxide-semiconductor (CMOS), that receives light beams, e.g., light beams reflected by an object 260, and generates electrical signals based on the received light beams. The optical path 230 may include one or more lenses 240 that are transparent to light beams (e.g., to light beams within a specific wavelength range such as human visible light range) and focus incoming light beams onto the image sensor 220. The optical path 230 may include an exterior surface 250. The exterior surface 250 may include at least one of a lens 240, a transparent cover, and a part of a vehicle 100 windshield, e.g., an outer surface of windshield that may be within the field of view 290.

Figure 3:
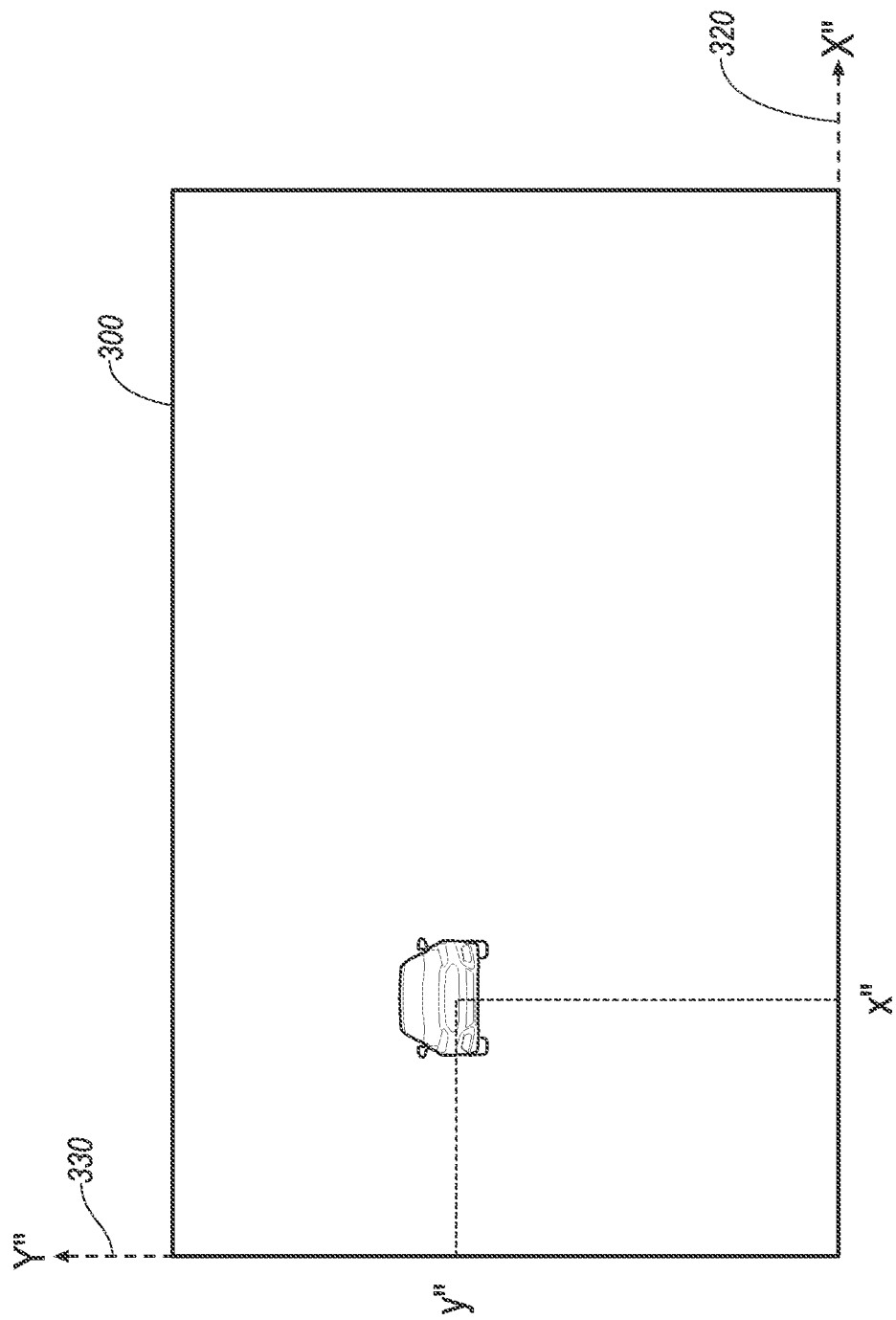
FIG. 3 is an example image received by the vehicle sensor of FIG. 2A.

With reference to FIG. 3, the computer 110 may be programmed to generate an image 300 based on electrical signals from the image sensor 220. An image 300, in the present context, is a digital image that is storable in a computer 110 memory. A digital image may include a plurality of pixels and the image data may include data such as image intensity and/or color associated with each one of the pixels. The lenses 240 may be formed of plastic and/or glass. Further, the optical path 230 may include one or more other transparent components such as a light filter, a protection cover, etc. In another example, the optical path 230 may include a portion of a vehicle 100 transparent exterior cover, e.g., a portion of the windshield positioned within a field of view a forward-looking camera sensor 130 mounted behind the vehicle 100 windshield providing image data from an area outside of the vehicle 100. In the present disclosure, "transparency" includes any of transparent components of the optical path 230.

With reference to FIGS. 1-3, the computer 110 may be programmed to receive, from the camera sensor 130, an image 300 that includes an area within the field of view 290 of the camera sensor 130. FIG. 2B shows a two-dimensional Cartesian coordinate system defined by an X' axis 270 and a Y' axis 280 which specifies coordinates of points on a surface of the lens 240 and/or any transparent component within the optical path 230. FIG. 3 shows an example image 300 received from the camera sensor 130 of FIG. 2A, and a two-dimensional Cartesian coordinates system defined by an X" axis 320 and a Y" axis 330. A light beam originated (e.g., reflected and/or illuminated) from a point x, y, z on the object 260 may pass through a point x', y' of the lens 240 and result in a point (or pixel) with coordinates x", y" in the image 300. The computer 110 may be programmed to identify the location coordinates x', y' based on the location coordinates x", y" and optical attributes of the optical path 230. For example, a lens 240 may cause a distortion of light beams passing through the lens 240, resulting in warping images captured by a camera sensor 130. A distortion attribute of the lens 240 may be specified with a mathematical model, e.g., defined based on a lens 240 specification. The computer 110 may be programmed, based on the mathematical model of the lens 240, to determine the coordinates of a point x', y' based on the coordinates x", y" in the image 300.

If the point specified by coordinates x', y' on the exterior surface 250 of the sensor 130 is partially or fully blocked, e.g., by rain drop, fog, etc., the image data for the pixel x", y" of the camera sensor 130 may be incorrect (i.e., may not reflect the light beams received from the point x, y, z). "Partially blocked," in the present context, means that the occlusion is translucent, e.g., a rain drop allows light beams to pass through, but affects received image data from the sensor 130. A partial or full blockage of a point on the exterior surface 250 (or anywhere within the optical path 230, e.g., inside the lenses 240) may result in a misclassification of the object 260 by a computer 110 that is programmed to detect objects 260 based on the image data received from the camera sensor 130.

With reference to FIG. 1, the HMI 140 may be configured to receive information from a user during operation of the vehicle 100. Moreover, a HMI 140 may be configured to present information to the user. Thus, a HMI 140 may be located in the passenger compartment of the vehicle 100. In one example, the computer 110 may be programmed to output a message to the HMI 140 indicating that the optical path 230 is fully or partially occluded, e.g., because of rain, smudge, fog, etc. and/or degrading of sensor 130 components such as the lens 240, etc.

Figure 4:
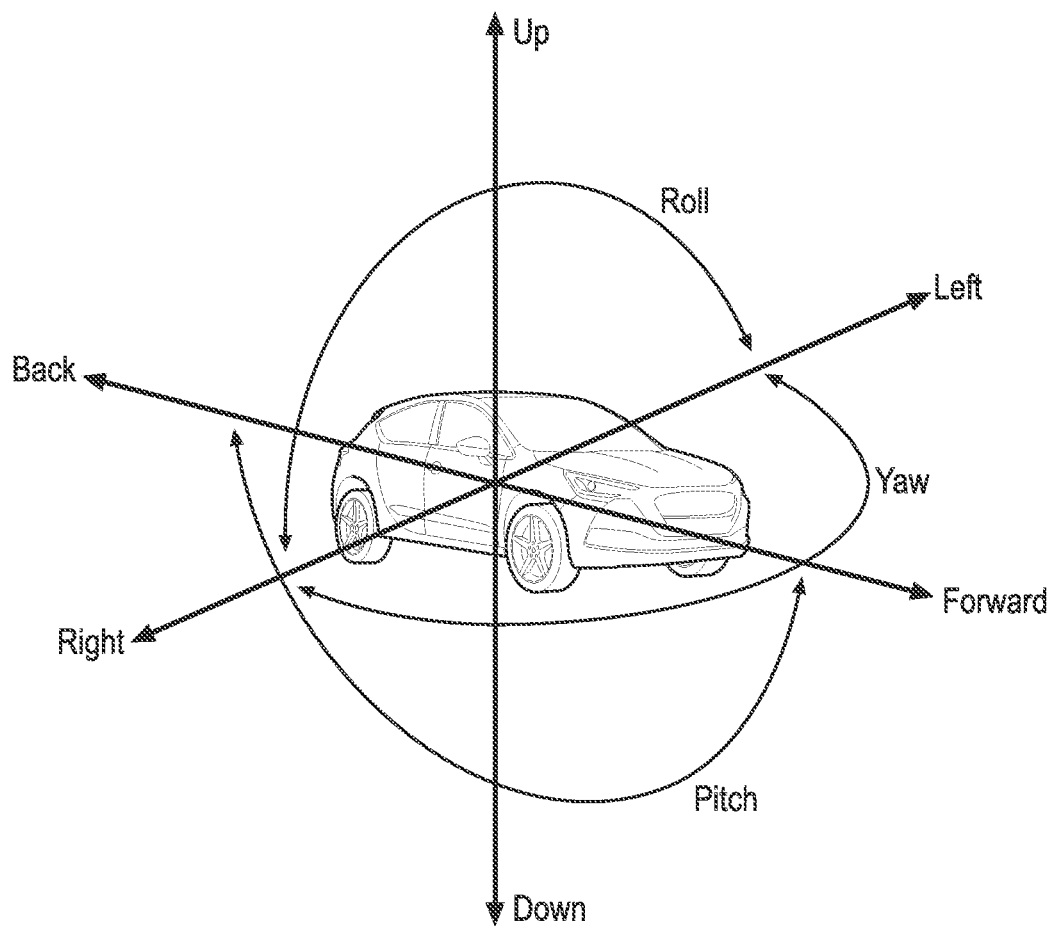
FIG. 4 is a perspective view of the vehicle of FIG. 1 with example orientation vectors superimposed thereon.

With reference to FIG. 4, the vehicle 100 may include an orientation sensor 130 that provides data indicating a current roll, pitch, yaw, and/or vertical position of the vehicle 100. An orientation sensor 130 may include chips and/or mechanical components. An orientation of the vehicle 100 to a reference such as ground level includes a scalar three-dimensional vector with a specified origin, e.g., at the vehicle 100 reference point 150, indicating a direction of the vehicle 100 relative to a reference three-dimensional coordinates system, e.g., the global coordinate system discussed above. For example, the orientation may include an algebraic sum, such as is known, of various independent vectors, each indicating a direction of the vehicle relative to a respective reference direction, e.g., a pitch, a yaw, and a roll of the vehicle 100. Additionally or alternatively, the orientation may include a three-dimensional vector including longitudinal, lateral, and vertical x, y, z coordinates with reference to the X, Y, Z axes 170, 180, 190.

Referring to FIGS. 2A-2B, 3 and 4, the computer 110 may be programmed to estimate location coordinates x", y" with reference to the X", Y" axes 320, 330 of a first point in the image 300 that is a projection of a second point within the field of view 290 based on (i) location coordinates of the second point relative to the X, Y axes 170, 180, 190, (ii) orientation of the sensor 130, and (iii) mathematical model of the transparency of the sensor 130. In other words, the computer 110 may be programmed to estimate location coordinates x", y" of the first point in the image 300 that is a projection of a second point with location coordinates x, y, z (e.g., GPS location coordinates) based on the orientation of the vehicle 100 and mathematical attributes of the optical path 230. The computer 110 may be programmed to determine the orientation of the sensor 130 based on predetermined orientation of the sensor 130 (i.e., fixed based on vehicle 100 design) relative to the vehicle 100, e.g., location coordinates, pitch, yaw, and/or roll of the sensor 130 relative to a three-dimensional coordinate system such a Cartesian coordinate system with an origin at the vehicle 100 reference point 150.

Figure 5:
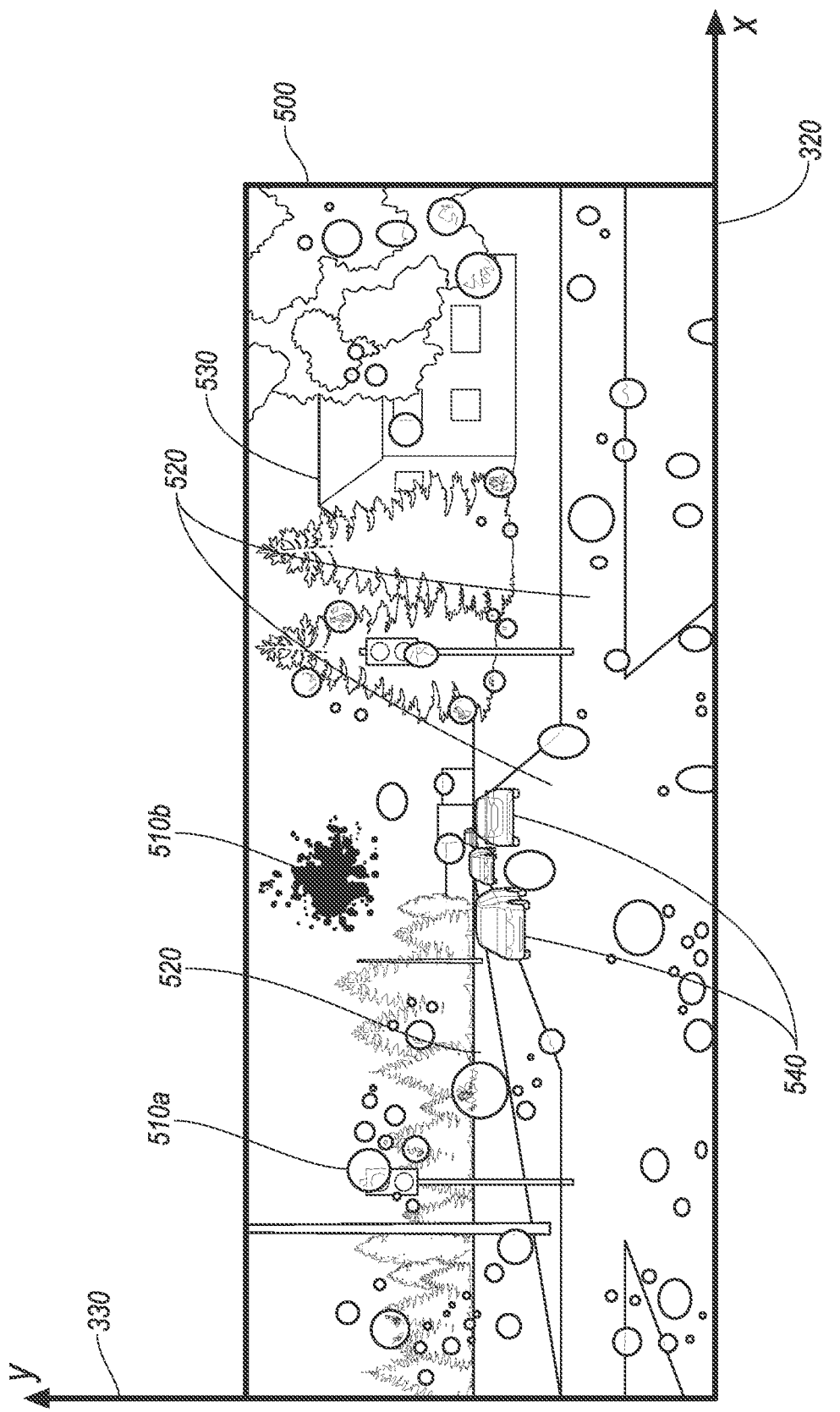
FIG. 5 shows an example image received from a camera sensor having occlusions on a sensor transparency.

FIG. 5 shows an example image 500 received from a vehicle 100 camera sensor 130 that has an occlusion 510a, 510b, e.g., water, rain drop, fog, insect impact, bird byproduct, etc., on the sensor 130 exterior surface 250. For example, FIG. 5 shows an example rain drop occlusion 510a and an example insect occlusion 510b. As discussed above, occlusions 510a, 510b in the example image 500 are projections of occlusions on the exterior surface 250 and/or within the transparency of the sensor 130. Although FIG. 5 shows multiple occlusions, for convenience, only the occlusions 510a, 510b are numbered. Additionally or alternatively, an occlusion 510a, 510b may be an area of the optical path 230, e.g., in and/or on the lens 240, the windshield, etc., where an optical attribute of the optical path 230 deviates from a specified optical attribute. As is conventionally understood, optical attributes (or optical properties) of a material define how it interacts with light. Examples of optical attributes may include refraction, reflection, translucence, etc. In the context of an optical path 230, the optical attributes may include focal length, lens 240 distortion model parameter, convergence, etc. A deviation of an optical attribute may be a result of aging of the glass and/or plastic, physical damage, e.g., a scratch, a degradation of a physical component, e.g., glue, of the optical path 230 that causes a misalignment and/or an out-of-focus condition of the optical path 230. For example, the computer 110 may fail to detect a road 520, a building 530, other vehicles 540, etc. based on received image 500 data from a vehicle 100 sensor 130 that has occlusions 510a, 510b of the exterior surface 250.

The computer 110 can be programmed to detect an occlusion 510a, 510b on a surface 250 of the vehicle 100 sensor 130 optical path 230 based on a semantic segmentation of sensor 130 image 500 data, and to select a cleaning plan for the surface 250 based on the detected occlusion 510a, 510b, map data, and/or vehicle 100 route data.

In the present context, a "cleaning plan" specifies parameters for actuating a cleaning actuator 120, including a time $t_c$ of actuation of a vehicle 100 cleaning actuator 120, e.g., a wiper, sprayer, etc., and/or a predicted duration of cleaning (i.e., actuation). Additionally, the cleaning plan may include a type of cleaning actuator 120, e.g., wiper, sprayer, etc., and/or a mode of operation, i.e., a parameter specifying a quantity by which the actuator 120 is to be controlled, of the actuator 120. For example, a mode of operation of a wiper actuator 120 may include one of low speed, high speed, etc. As another example, a mode of operation of a sprayer actuator 120 may include one of high pressure actuation, low pressure actuation, etc. Selection of a cleaning plan is discussed below with reference to FIG. 9.

Figure 6:
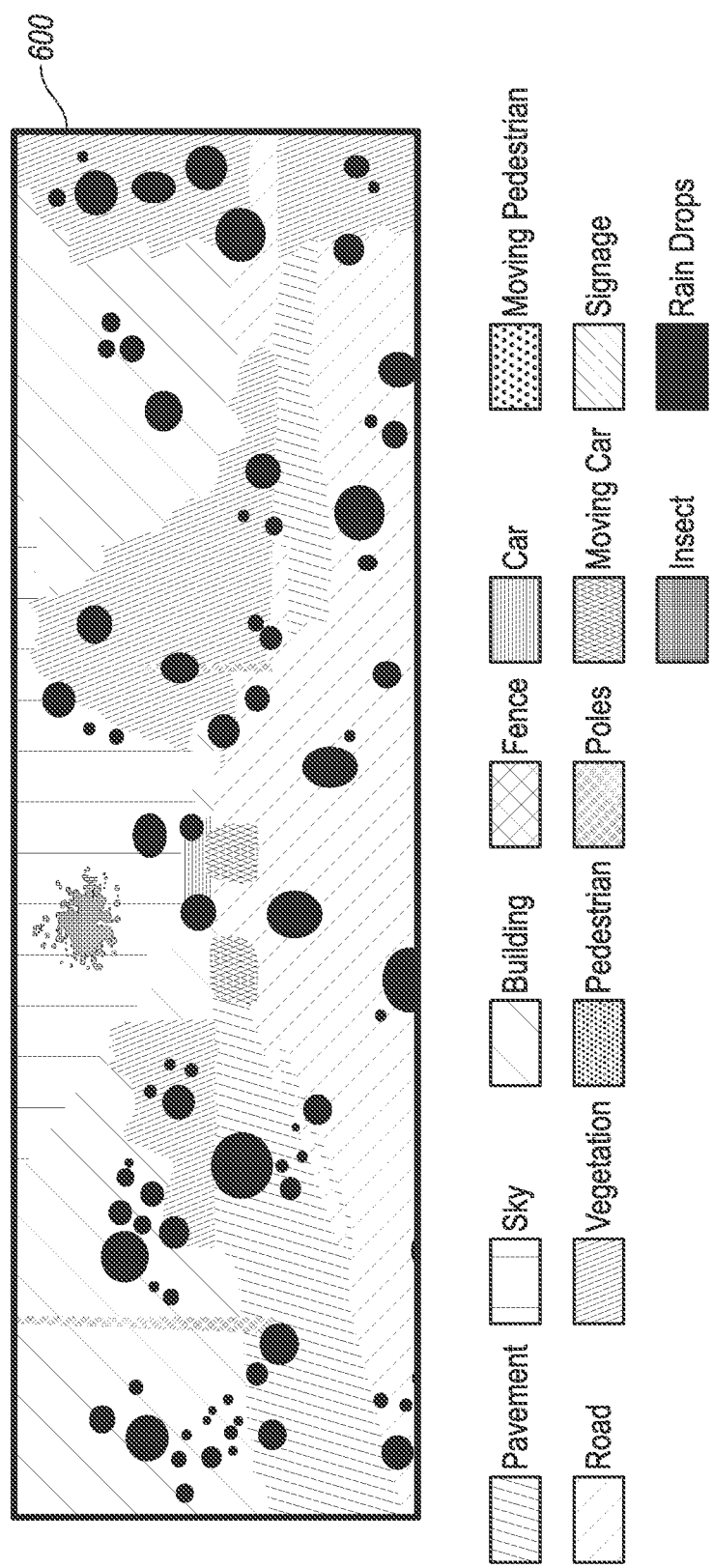
FIG. 6 shows a semantic segmentation of the example image of FIG. 5.

With reference to FIG. 6, the computer 110 may be programmed to detect feature(s) in the received image 500 data and classify the features based on specified feature classes. FIG. 6 is a visualization of results of feature classification superimposed on the example image 500. Additionally or alternatively, the computer 110 may be programmed to store the classification of the features of an image 500 in any other suitable form, e.g., a table specifying a class and/or sub-class for each pixel of the image 500. Additionally or alternatively, the computer 110 may be programmed to detect features based on other sensors 130 data, e.g., LIDAR sensor 130, a second camera sensor 130, etc.

TABLE 1

| Class | Sub-class | description |
| --- | --- | --- |
| Building | — | single or multi-level structure, bridge, etc. |
| Vegetation | — | Tree, shrub, lawn, etc. |
| Pedestrian | Moving Non-moving | Adult and/or child pedestrian moving faster than |
| Car | Moving Non-moving | Truck, passenger car, train, motorbike, bike, etc. |
| Sky | — | Sky including clouds, stars, and/or objects in sky such as planes, birds, etc. |
| Pavement | — | Impervious surfaces, e.g., concrete, asphalt, etc., not for cars, e.g., side walk. |
| Road | — | Roads for vehicles such as freeway, highway, street, etc. |
| Signage | — | Traffic signs, e.g., speed limit, no entry sign, etc. |
| Occlusion | Rain drop Fog Dust Smudge Insect Bird byproduct | Occlusion class includes any partial or full blockage within the optical path, e.g., on and/or in the lens, protective surface, windshield, etc. |

In the present context, the "features" include points, lines, edges, corners, color, textures, and/or other geometric entities found in the image 500. These features may be programmed using pre-determined feature, e.g. Haar-like features, histogram of oriented gradients, wavelet features, scale invariant feature transform etc. Alternatively or additionally, the features may be learnt based a labeled data set where a machine learning algorithm, e.g. a neural network, that is trained such that the weights and bias of the network are adjusted through backpropagation to reduce the prediction error or commonly known as the loss of the network's prediction. The features are divided into classes in accordance to shape, appearance, etc. With reference to Table 1, classes may include a building, car, pavement, pedestrian, sky, vegetation, poles, signage, and/or an occlusion class. A class of features may be divided into two or more sub-classes. For example, a car class may be divided into "moving" cars and "non-moving" cars. In another example, the occlusion class may include sub-classes such as rain drop, fog, smudge, etc. The example image 600 illustrates occlusions 510a, 510b classified as rain drop sub-class.

In the present context, "segmentation" (or semantic segmentation) includes an image processing technique to classify the features in an image 500. The computer 110 may be programmed to associate a class and/or sub-class to each one or more of points (or pixels) of the image 500. In one example, the computer 110 may be programmed to perform the segmentation of the image 500 data based on an output of a neural network trained to detect multiple feature classes including at least an occlusion class. An occlusion class, in the present context, may include rain, fog, insects, etc.

A "neural network" (NN) is a computing system implemented in software and/or hardware that is inspired by biological neural networks. A neural network learns to perform tasks by studying examples generally without being programmed with any task-specific rules. A neural network can be a software program that can be loaded in memory and executed by a processor included in a computer, for example the computer 110. The neural network can include n input nodes, each accepting a set of inputs i (i.e., each set of inputs i can include on or more inputs x). The neural network can include m output nodes (where m and n may be, but typically are not, a same number) provide sets of outputs $o_1 \ldots o_m$. A neural network typically includes a plurality of layers, including a number of hidden layers, each layer including one or more nodes. The nodes are sometimes referred to as artificial neurons, because they are designed to emulate biological, e.g., human, neurons. Additionally or alternatively, a neural network may have various architectures, layers, etc. as known in the art.

For example, a neural network may learn to classify features in an image 500 by analyzing training data, e.g., ground truth image data with predetermined classifications. For example, the ground truth data may include images 500 that are classified in a lab, e.g., based on determinations made by a reference algorithm, a user, etc. For example, the neural network may be trained to classify various sub-classes of occlusion 510a, 510b such as rain drop, fog, etc. based on inputted ground truth images 500. A ground truth image 500 may include additional meta data specifying location coordinates x", y" of a feature such as rain drop. Additionally or alternatively, other machine learning techniques, such as SVM (Support Vector Machine), decision trees, naïve-bayes, ensemble methods, etc. may be implemented to classify the features that are extracted from (or detected) in the received image 500 data. Additionally or alternatively, the neural network may be trained to determine a class and/or sub-class associated with a set of pixels (or super pixels or stixels) determined in the image 500. As is conventionally understood, a super pixel is a set of pixels that may be tracked by an image processing algorithm over multiple image 500 frames, e.g., to determine a speed, location, direction, etc., of a moving vehicle, a pedestrian, etc.

Figure 7:
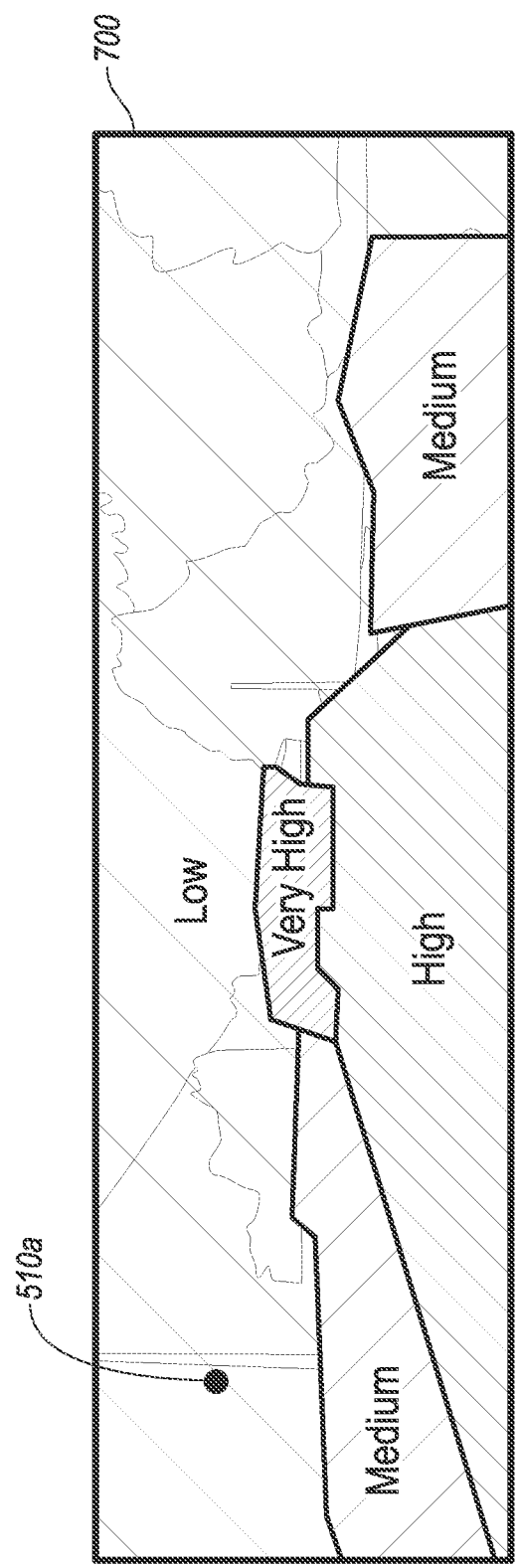
FIG. 7 shows first example priority classification of various locations of the example image of FIG. 5 at a first time.

FIG. 7 shows an image 700 that illustrates priorities of points of the example image 500 superimposed on the image 500. In the present context, a "priority" of a point specifies an importance of image data in the respective point for operation of the vehicle 100. As discussed above, the vehicle 100 may be operated, e.g., in an autonomous or semi-autonomous mode, based at least in part on the sensor 130 data. The computer 110 may actuate the vehicle 100 actuators 120, e.g., propulsion, steering, and/or braking, to navigate the vehicle 100 on a route to a destination. The computer 110 may navigate the vehicle 100 on a road while preventing a collision with another object such as another vehicle 100, a pedestrian, road signage, etc. Thus, the priority may be based on an importance of data at a point in the image 500 for operating the vehicle 100.

The computer 110 may be programmed to determine a priority of a location (with respect to X", Y" axes 320, 330) in the image 500 based on a classification of the feature viewed at the respective location. For example, the computer 110 may be programmed to determine a "high" priority for pedestrian class, road class, moving vehicles class, etc., a medium "priority" for pavement class, building class, etc., and a "low" priority for sky class, vegetation class, etc. Additionally or alternatively, a priority of a location in the image 500 may be based on location coordinates x", y" and an orientation of the sensor 130 relative to the vehicle 100 (e.g., relative to a 3D coordinate system with an origin at the reference point 150). For example, the example image 500 may be received from a forward-facing camera sensor 130. Thus, locations that are substantially at a center of the image 500 may be identified as "high" priority locations, because typically other objects such as cars, pedestrians, etc., may be detected in a path of the vehicle 100 in that area of the image 500.

The computer 110 may be programmed to actuate a vehicle 100 cleaning actuator 120 based on a priority of a location on the surface 250 of the sensor 130. As discussed above, different locations on an exterior surface 250 may have different priorities. For example, the compute 110 may be programmed to select a cleaning plan, e.g., actuating the cleaning actuator 120, upon determining that a priority associated with location coordinates of an occlusion on the surface 250 exceeds a specified priority threshold, e.g., "medium" priority. This may result in preventing a cleaning of the surface 250 when an occlusion is in a low priority location of the surface 250, which may reduce energy consumption, washer fluid consumption, etc.

In another example, the computer 110 may be programmed to select a priority threshold for cleaning based on the vehicle 100 speed, and upon determining that the priority of the location on an exterior surface 250 of the sensor 130 exceeds the selected priority threshold, to actuate a vehicle cleaning actuator to clean the exterior surface 250. For example, the computer 110 may be programmed to determine, for a feature determined to have a moving vehicle class, road class, and/or pedestrian class, (i) a "high" priority upon determining that the ego vehicle 100 speed exceeds a speed threshold, e.g., 50 kilometer per hour (kph), and (ii) a "medium" priority upon determining that the ego speed is less than the speed threshold. In other words, an increase of vehicle 100 speed may change the priority of a specific feature class.

Figure 8:
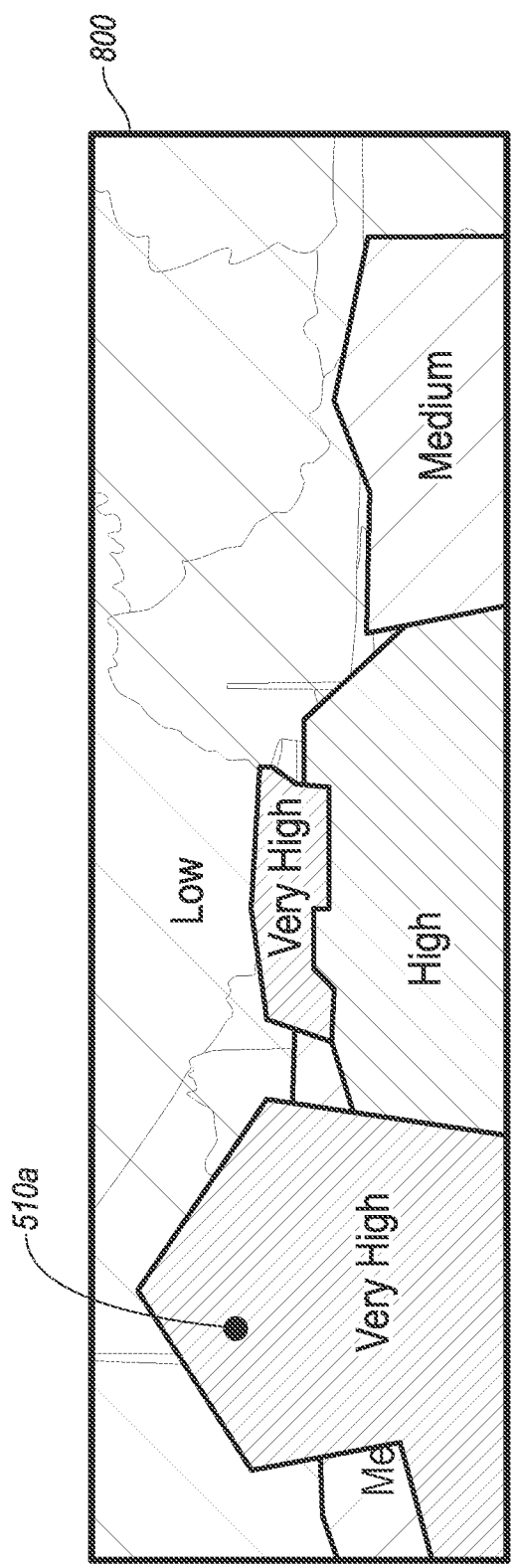
FIG. 8 show a second example priority classification of various location of the example image of FIG. 5 at a second time.

With reference to FIGS. 7-8, a priority associated with location coordinates of an occlusion 510a may change. For example, the location coordinates of the occlusion 510a in FIG. 7 is located in a "low" priority, and in a "very high" priority in FIG. 8. For example, the occlusion 510a in FIG. 7 may be located at an area of the field of view 290 including vegetation, sky, etc., whereas the occlusion 510a in FIG. 8 may be located in an area of the field of view 290 including a freeway ramp.

As discussed above with reference to FIGS. 1-4, the computer 110 may be programmed to determine projection(s) of features, e.g., road, building, etc., around the vehicle 100 based on orientation of the sensor 130 relative to the vehicle 100, vehicle 100 route data, map data, the sensor 130 field of view 290, etc. The computer 110 may be programmed to predict a class for one or more features predicted to be viewed at location coordinates x, y with respect to the axes 320, 330 including a location (i.e., one or more points) on the exterior surface 250 based on the sensor 130 field of view, the vehicle 100 route data, and the map data, and to determine a priority of the location based at least in part on the predicted class. In other words, based on the field of view 290 of the sensor 130, map data, route data, vehicle-to-vehicle and/or vehicle-to-infrastructure communication, etc., the computer 110 may predict which feature class will be at which location coordinates x, y of the image 500, as the vehicle 100 navigates to a specified destination. For example, with reference to FIG. 8, based on specified route and map data, the computer 110 may predict that the occlusion 510a may change to a "very high" priority location of the image 500, although upon merging to the freeway.

Figure 9:
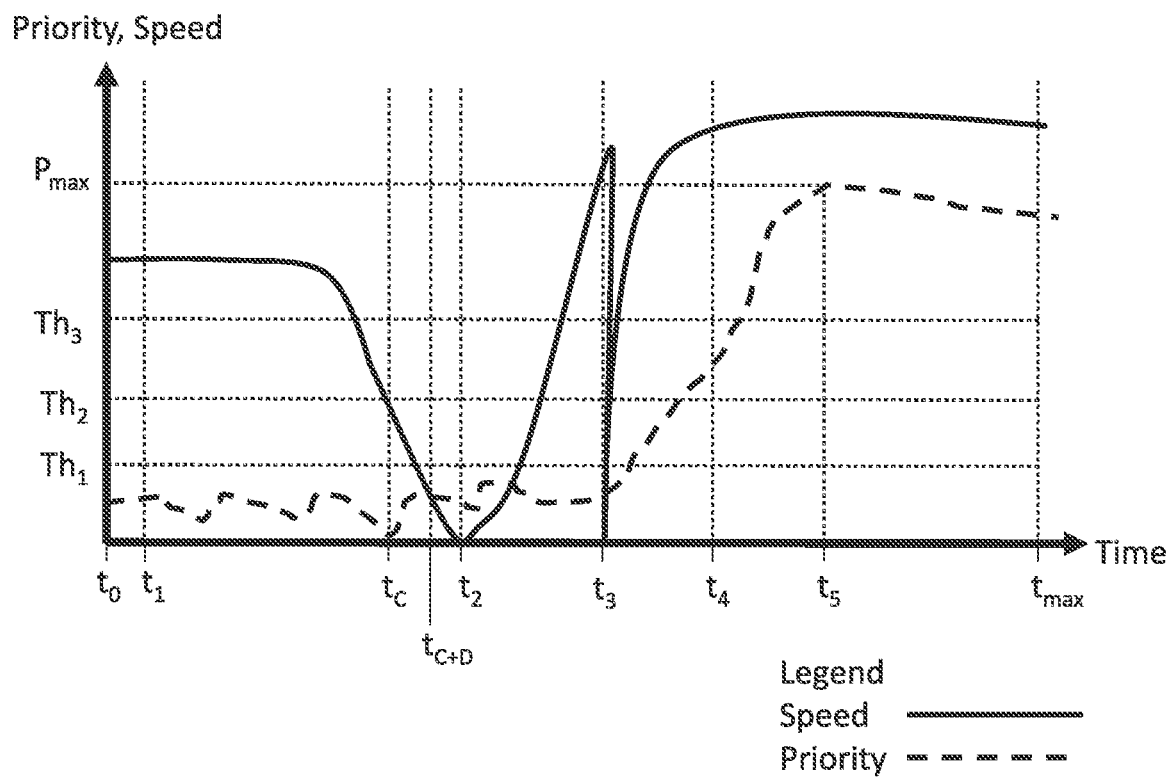
FIG. 9 shows example graphs of vehicle speed, changes of a priority of an image area, and multiple priority thresholds.

FIG. 9 illustrates changes of a vehicle 100 speed and a priority of a location (e.g., of the occlusion 510a) on the surface 250. An example graph 910 shows changes of vehicle 100 speed versus time, whereas an example graph 920 shows changes of the priority of the location x, y of the occlusion 510a versus time. The computer 110 may be programmed to determine a location of, e.g., the occlusion 510, on the exterior surface 250, to predict a change of priority of the location on the exterior surface 250 based on the vehicle 100 route, and to plan the time of cleaning based on the predicted priority and a vehicle 100 speed.

The example graph 910 may illustrates changes of the vehicle 100 speed as the vehicle 100 navigates on a road. For example, at a time $t_1$, the vehicle 100 may navigate with an initial speed, e.g., 20 kph. The vehicle 100 may stop at a traffic light, e.g., at a time $t_2$, and then may navigate to a freeway while reducing speed at a freeway ramp, e.g., at a time $t_3$, and then increasing speed while merging to the freeway, e.g., at a time $t_4$.

With reference to FIGS. 7 and 9, until, e.g., the time $t_3$, the vehicle 100 sensor 130 may receive, at an area of the image 500 including the location coordinates of the occlusion 510a, image 500 data including e.g., vegetation, etc. With reference to FIGS. 8-9, after the time $t_3$, the sensor 130 may receive the location of the occlusion 510a, image 500 data including freeway ramp. As discussed above with reference to FIGS. 7-8, the computer 110 may determine a change of the priority of the location of the occlusion 510a as the vehicle 100 navigates on the freeway ramp (e.g., after time $t_3$). Additionally or alternatively, the computer 110 may predict the change of priority based on a specified vehicle 100 route. For example, the computer 110 may be programmed to predict that the vehicle 100 at a time $t_4$ may navigate at the freeway ramp to merge to the freeway, to predict an increase of the priority to, e.g., very high priority, based on the predicted feature class data, e.g., road.

The computer 110 may be programmed to determine a cleaning score s (x, y) based on a priority of the location of the occlusion 510a, a vehicle 100 speed, a number of occluded pixels in the image 500 data, and a duration of cleaning, and to select the cleaning plan based on the determined score s (x, y). In the present context, a cleaning score s(x, y) is a quantifier specified with, e.g., a percentage, and/or a number within a range, e.g., 0 (zero) to 1 (one), that indicates a necessity of cleaning at location coordinates x, y with reference to X", Y" axes 320, 330 (see FIG. 3) of the surface 250. In one example, a high score s (x, y), e.g., 1 (one), may indicate that a cleaning plan for the surface 250 is warranted (or needed), whereas a low score s (x, y), e.g., 0 (zero), may indicate that a cleaning plan for the surface 250 may not be warranted (or needed).

$$s(x, y, t) = blockage_{coeff}(x, y) \cdot \left( w_1 \cdot P(x, y, t) + w_2 \cdot \frac{1}{V(t)} + w_3 \cdot \frac{1}{D} \right) \quad (1)$$

With reference to equation (1), the computer 110 may be programmed to determine and/or predict a cleaning score s(x, y, t) for time t at location coordinates x, y with reference to the X", Y" axes 320, 330 based on the determined and/or predicted priority P(x, y, t) for time t in the location coordinates x, y, the vehicle 100 speed V(t) at time t, and/or a duration of actuation or cleaning duration D, e.g., 3 seconds, of a cleaning actuation. The score s (x, y, t) may increase upon an increase of the priority P (x, y, t), a decrease of the speed V(t), and/or a decrease of the duration D. The computer 110 may be programmed to select a cleaning plan, e.g., including a time of cleaning $t_c$ and/or duration D of cleaning, based on the determined score s (x, y, t). The cleaning duration D may be a specified fixed duration, e.g., 3 seconds, or one of multiple specified durations D, e.g., 3, 4, 5 seconds. The computer 110 may be programmed to select the cleaning duration D based on the detected class, e.g., based on a table stored in a computer 110 memory which associates a cleaning duration D to each class and/or sub-class. For example, a first cleaning duration D, e.g., 1 second, associated with a sub-class rain drop may be shorter than a cleaning duration D, e.g., 3 seconds, associated with a sub-class inspect, bird byproduct, etc.

Weights $w_1$, $w_2$, $w_3$ may be determined based on empirical techniques. In one example, ground truth data may be inputted to the computer 110 and the weights $w_1$, $w_2$, $w_3$ may be determined based on optimization techniques. The weights may be optimized such that a rate of detection of occluded area 510 is maximized. In one simplified example, the weights $w_1$, $w_2$, $w_3$ may be 1. As discussed above, an occlusion 510a, 510b may be translucent, i.e., partially blocking light beams. The blockage coefficient $blockage_{coeff}$, in the present context, is a quantifier specifying an amount of blockage at location coordinates x, y of the surface 250, e.g., 0 (zero) for a clean surface 250 and 1 for a fully blocked surface 250. The computer 110 may be programmed to determine a blocking coefficient $blockage_{coeff}$ for each one or more of pixels of the image 500. The computer 110 may be programmed to store the determined blocking coefficients $blockage_{coeff}$ in a matrix form, e.g., a W×H matrix for an image 500 with width and height W, H. The neural network may be trained to estimate the blocking coefficient $blockage_{coeff}$ for each of the occlusion(s) 50, 510b. For example, a rain drop may have a lower blocking coefficient $blockage_{coeff}$ compared to a blocking coefficient $blockage_{coeff}$ of an insect, bird byproduct, etc. In one example, the computer 110 may be programmed to determine that an occlusion 510a, 510b exists at location coordinates x, y of the surface 250, upon determining that the blocking coefficients $blockage_{coeff}$ at the location coordinates x, y exceeds a specified threshold, e.g., 0.1.

The computer 110 may be programmed to actuate the cleaning actuator 120 based on one or more score thresholds $Th_1$, $Th_2$, $Th_3$. For example, the computer 110 may be programmed to actuate the cleaning actuator 120 upon determining that the score s (x, y, t) of at least one location on the surface 250 exceeds the threshold $Th_1$ and the vehicle 100 speed is 0 (zero). The computer 110 may be programmed to actuate the cleaning actuator 120 for a duration D upon determining that the vehicle 100 speed is less than a speed threshold, e.g., 20 kph, and the score s (x, y, t) exceeds the threshold $Th_2$. The computer 110 may be programmed to actuate the cleaning actuator 120 for a duration D upon determining that the score s (x, y, t) exceeds the threshold $Th_3$ (without considering the vehicle 100 speed V). Additionally, the computer 110 may be programmed to predict score s (x, y, t) so that the cleaning plan, e.g., speed of a wiper actuator 120, can be adjusted based on the predicted score s (x, y, t).

$$S = \sum_{x=1}^{x=W} \sum_{y=1}^{H} s(x, y) \quad (2)$$

The computer 110 may be programmed to select the cleaning plan further based on a number of occluded pixels (i.e., a number of image 500 pixels occluded by an occlusion 510a, 510b). With reference to example equation (2), the computer 110 may be programmed to determine a global cleaning score S for the exterior surface 250. The width and height W, H may be a number of points, pixels, etc. included in the image 500 with respect to the X", Y" axes 320, 330.

$$P_{max}(x, y) = \text{maximum} (P(x, y, t_0), \ldots, P(x, y, t_{max})) \quad (3)$$

$$s_n(x, y, t) = blockage_{coeff} \cdot \left( w_1 \cdot P_{max}(x, y) + w_2 \cdot \frac{1}{V(t)} + w_3 \cdot \frac{1}{D} \right) \quad (4)$$

As discussed with reference to the example graph 920, the priority P (x, y, t) may change based on speed V(t), feature class, etc. As shown in the graph 920, the priority P (x, y, t) increases after the time $t_3$ based on predicting at the location coordinates x, y, freeway merging ramp (road feature class). The computer 110 may be programmed to select an earlier time, e.g., the time $t_2$, in which the vehicle 100 stops at a traffic light, to clean the surface rather than a later time such as the time t4 in which an actuation of the cleaning actuator 120 may impair an operation of the vehicle 100 (e.g., partially blocking the sensor 130 for the cleaning duration).

$$S_n = \Sigma_{x=1}^{x=W} \Sigma_{y=1}^{H} s_n(x, y) \qquad (5)$$

With reference to equation (3), the computer 110 may be programmed to determine a maximum priority $P_{max}(x, y)$ for a specified vehicle 100 trip duration (e.g., start time $t_0$ to end time $t_{max}$) and to determine a normalized score $s_n(x, y, t)$ for location coordinates x(x, y) based on the maximum priority $P_{max}(x, y)$, the speed V(t) and/or the duration of cleaning actuation. In the present context, "normalized score $s_n(x, y, t)$" is a score that is based on the maximum priority $P_{max}(x, y)$ in contrast to score s(x, y, t) that takes into account a priority P(x, y, t) at the time t. The time $t_{max}$ may be a time of arriving at a destination, i.e., an end of the vehicle 100 route. With reference to equation (5), the computer 110 may be programmed to determine a global cleaning score $S_n$ based on the determined normalized scores $s_n(x, y)$. In the present context, the global normalized score $S_n$ specifies a score of cleaning for entire exterior surface 250 (associated with the width and height W, H of the image 500). Typically a larger occlusion 510a, 510b may take more cleaning duration D, air pressure, and/or fluid pressure to be cleaned compared to a smaller occlusions 510a, 510b that covers a smaller portion of the surface 250. In one example, the computer 110 may be programmed to determine the normalized score $S_n$ further based on a number of contiguous (or touching) locations x, y that are covered with an occlusion 510a, 510b, e.g., an insect. In other words, the computer 110 may be programmed to determine the normalized score $S_n$ further based on a surface of an occlusion 510a, 510b, e.g., based on an additional second order expression included in the equation (5). In the present context, the surface of occlusion 510a, 510b is a surface of the portion of the surface 250 that is covered by the occlusion 510a, 510b, e.g., insect.

With reference to equations (3)-(4) and the occlusion 510a shown in FIGS. 7-8, the computer 110 may determine a $P_{max}(x, y)$ to be "very high" based on predicted priority P(x, y, $t_4$) at a time $t_4$ of merging to the freeway (as discussed above with reference to FIG. 8). In other words, the maximum priority $P_{max}(x, y)$ for the location coordinates x, y is a maximum of priority values P(x, y, t) associated with the location coordinates x, y at any time during the route, i.e., from the time $t_0$ to $t_{max}$. For example, with reference to FIG. 9, the maximum priority Pmax(x, y) is a value of P(x, y, t) at a time $t_5$. Thus, the computer 110 may be programmed to actuate the actuator 120 to clean the surface 250 at a traffic light stop time $t_2$, thus, preventing a cleaning of the exterior surface 250 at, e.g., times $t_4$ to $t_5$ which may impair the vehicle 100 operation.

Figure 10:
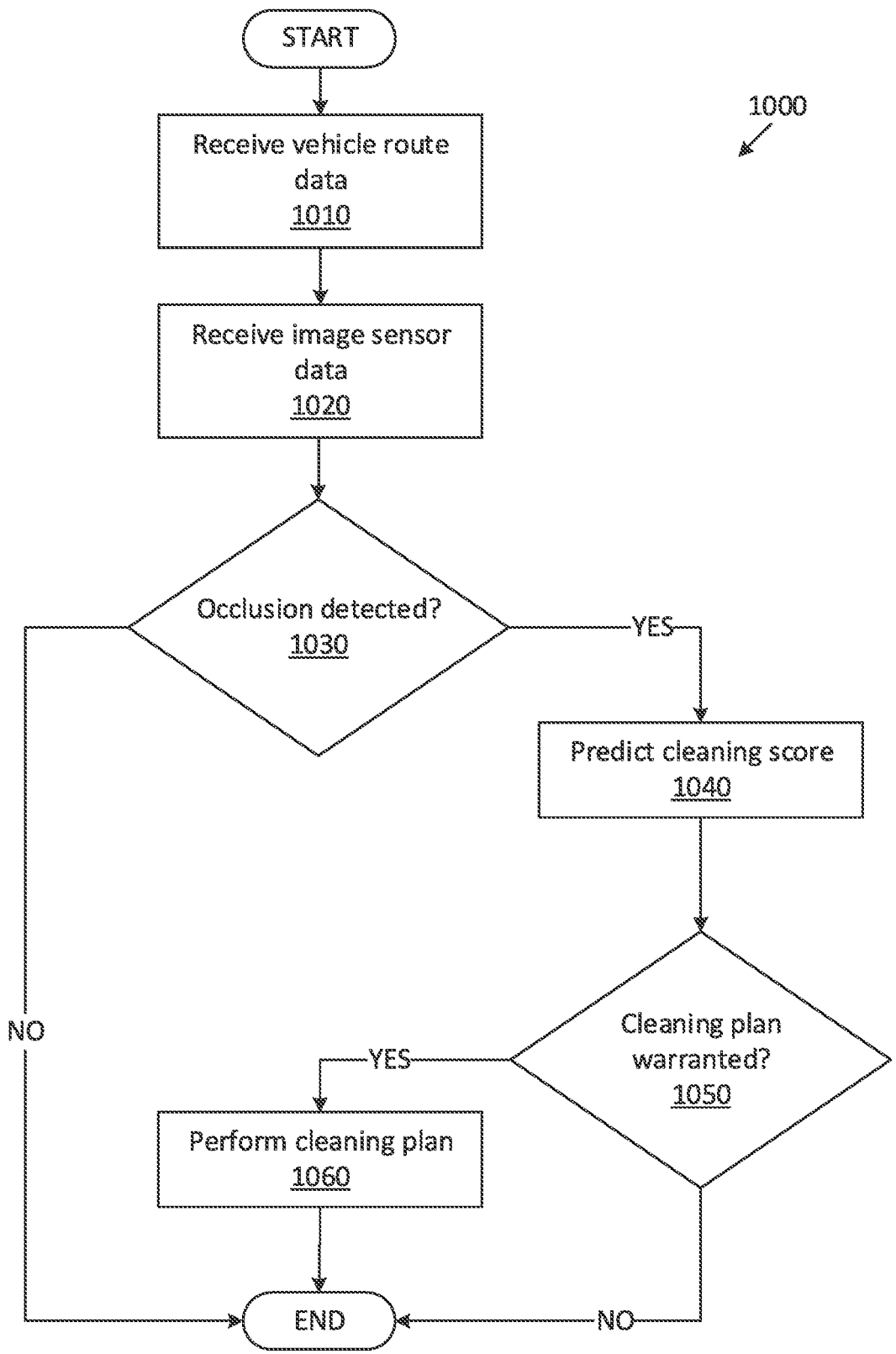
FIG. 10 is a flowchart diagram of an example process to clean a vehicle sensor transparency.

FIG. 10 shows a flowchart of a process 1000 to clean a vehicle 100 sensor 130 transparency. The computer 110 may be programmed to execute blocks of the process 1000.

The process 1000 begins in a block 1010, in which the computer 110 receives vehicle 100 route data. The computer 110 may be programmed to receive vehicle map data, vehicle 100 location coordinates with respect to the axes 170, 180, 190, e.g., GPS (global positioning system) coordinates, vehicle 100 route, speed V(t) along the vehicle 100 route, etc.

Next, in a block 1020, the computer 110 receives image 500 data. The computer 110 may be programmed to receive image 500 data from a vehicle 100 camera sensor 130.

Next, in a decision block 1030, the computer 110 determines whether an occlusion 510a, 510b is detected on the exterior surface 250 of the sensor 130. The computer 110 may be programmed to detect the occlusion 510a, 510 based on the output of a trained neural network. If the computer 110 detects an occlusion 510a, 510b, the process 1000 proceeds to a block 1040; otherwise the process 1000 ends, or returns to the block 1010, although not shown in FIG. 10.

In the block 1040, the computer 110 predicts the cleaning score s (x, y, t) for the occlusion 510a, 510b location coordinates x, y and a time t. Additionally or alternatively, the computer 110 may be programmed to predict a normalized score $s_n(x, y)$ for the vehicle 100 route from a time $t_0$ to a time $t_{max}$. Additionally or alternatively, the computer 110 may be programmed to determine a global cleaning score S for the exterior surface 250 based on the cleaning scores s (x, y, t) and/or the normalized cleaning scores $s_n(x, y)$. Additionally or alternatively, the computer 110 may be programmed to re-calculate the cleaning score S upon determining that a vehicle 100 route is changed, e.g., a new destination entered via the vehicle 100 HMI 140.

Next, in a decision block 1050, the computer 110 determines whether a cleaning plan is determined. The computer 110 may be programmed to determine a cleaning plan based on the global score S and/or the global normalized score $S_n$, the score threshold(s) $Th_1$, $Th_2$, $Th_3$, etc. In one example, the computer 110 may be programmed to determine a cleaning plan upon determining that a maximum of score during the vehicle 100 route exceeds a threshold $Th_1$. The computer 110 may be programmed to determine the time of cleaning $t_c$ based on a time of maximum score, i.e., at a time in which the score is maximum, e.g., at a low speed. If the computer 110 determines that a cleaning plan is warranted, then the process 1000 proceeds to a block 1060; otherwise the process 1000 ends, or alternatively, returns to the block 1010, although not shown in FIG. 10.

In the block 1060, the computer 110 performs the determined cleaning plan. The computer 110 may be programmed to actuate a cleaning actuator 120 to clean the surface 250 at a determined time of cleaning $t_c$ for a duration D. For example, the computer 110 may be programmed to actuate a wiper actuator 120 and/or a sprayer actuator 120 from the time $t_c$ to $t_c$+D. Additionally or alternatively, the cleaning plan may include a mode of operation, e.g., wiper speed level, wiper interval time, sprayer pressure, etc. The mode of operation may further include air pressure, cleaning actuator 120 selection, fluid pressure, and/or ultrasonic vibration attributes, e.g., frequency and/or intensity of vibration. The computer 110 may be programmed to actuate the cleaning actuator 120 further based on the mode of operation. Additionally, during performing the determined cleaning plan, the computer 110 may be programmed to operate the vehicle 100 based on data received from, e.g., a second sensor 130 of the vehicle 100, a sensor of a second vehicle, etc. Following the block 1060, the process 1000 ends, or returns to the block 1010.

Computers generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Python, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random-access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, selectron tube, magnetic drum memory, magnetostrictive delay line, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a processor and a memory, the memory storing instructions executable by the processor to:
   detect an occlusion at one or more points on a surface in a vehicle sensor optical path based on a segmentation of sensor image data that classifies objects in the vehicle sensor optical path to one of a plurality of segmentation classes, each of the plurality of segmentation classes classifying a type of object in the vehicle sensor optical path;
   determine a priority of the one or more points based on the detected occlusion, the segmentation classes identified in the sensor image data, map data including geo-coordinates of a location of a vehicle, and vehicle route data of a route on which the vehicle is navigating, the priority being an importance of data collected at the one or more points in the vehicle sensor optical path to operate the vehicle; and
   select a cleaning plan for the surface based on the segmentation class of the detected occlusion and the priority of the one or more points, the cleaning plan including a specified actuation of each of a wiper and a fluid sprayer and a time duration of the specified actuations.

2. The system of claim 1, wherein the instructions further include instructions to perform the segmentation of the sensor image data based on output of a neural network trained to detect a plurality of feature classes including at least an occlusion class.

3. The system of claim 2, wherein the plurality of feature classes further includes at least one of a road, a pedestrian, a car, a building, a vegetation, and a sky class.

4. The system of claim 1, wherein the surface includes at least one of a lens, a transparent cover, and a part of a vehicle windshield.

5. The system of claim 1, wherein the instructions further include instructions to
   determine the segmentation class of a location including one or more points on an exterior of the surface based on the sensor field of view, the vehicle route data, and the map data.

6. The system of claim 1, wherein the selected cleaning plan further includes a time of actuation of a vehicle cleaning actuator and a predicted duration of cleaning.

7. The system of claim 6, wherein the instructions further include instructions to:
   determine a location of the occlusion on an exterior of the surface;
   predict a change of the priority of the location on the exterior surface based on the vehicle route; and
   plan the time of cleaning based on the predicted change of the priority and a vehicle speed.

8. The system of claim 7, wherein the instructions further include instructions to select a priority threshold for cleaning based on the vehicle speed; and
   upon determining that the priority of the location on an exterior of the sensor exceeds the selected priority threshold, actuate the vehicle cleaning actuator to clean the exterior of the surface.

9. The system of claim 1, wherein the instructions further include instructions to:
   determine a cleaning score based on a priority of a location of the occlusion, a vehicle speed, a number of occluded pixels in the image data, and a predicted duration of a cleaning; and
   select the cleaning plan based on the determined score.

10. The system of claim 1, wherein the instructions further include instructions to perform the selected cleaning plan.

11. The system of claim 10, wherein the selected cleaning plan further includes at least one of a time of actuating a cleaning actuator, a duration of actuation, and a mode of operating the cleaning actuator.

12. The system of claim 11, wherein the instructions to perform the selected cleaning plan further include instructions to activate the cleaning actuator at the time of actuating the cleaning actuator for the duration of actuation.

13. The system of claim 11, wherein the instructions further include instructions to:
determine normalized scores from start to end of a vehicle route;
determine a time of maximum normalized score; and
determine the time of actuating the cleaning actuator based on the time of a maximum normalized score.

14. A system, comprising:
a vehicle camera sensor having an optical path; and
a processor programmed to:
detect an occlusion at one or more points on a surface in the optical path of the vehicle camera sensor based on a segmentation of sensor image data that classifies objects in the vehicle sensor optical path to one of a plurality of segmentation classes, each of the plurality of segmentation classes classifying a type of object in the vehicle sensor optical path;
determine a priority of the one or more points based on the detected occlusion, the segmentation classes identified in the sensor image data, map data including geo-coordinates of a location of a vehicle, and vehicle route data of a route on which the vehicle is navigating, the priority being an importance of data collected at the one or more points in the vehicle sensor optical path to operate the vehicle; and
select a cleaning plan for the surface based on the segmentation class of the detected occlusion and the priority of the one or more points, the cleaning plan including a specified actuation of each of a wiper and a fluid sprayer and a time duration of the specified actuations.

15. The system of claim 14, wherein the processor is further programmed to perform the segmentation of the sensor image data based on output of a neural network trained to detect a plurality of feature classes including at least an occlusion class.

16. The system of claim 14, wherein the processor is further programmed to
determine a predicted segmentation class of a location including one or more points on an exterior of the surface based on the sensor field of view, the vehicle route data, and the map data.

17. A method, comprising:
detecting an occlusion at one or more points on a surface in the optical path of a vehicle camera sensor based on a segmentation of sensor image data that classifies objects in the vehicle sensor optical path to one of a plurality of segmentation classes, each of the plurality of segmentation classes classifying a type of object in the vehicle sensor optical path;
determining a priority of the one or more points based on the detected occlusion, the segmentation classes identified in the sensor image data, map data including geo-coordinates of a location of a vehicle, and vehicle route data of a route on which the vehicle is navigating, the priority being an importance of data collected at the one or more points in the vehicle sensor optical path to operate the vehicle; and
selecting a cleaning plan for the surface based on the segmentation class of the detected occlusion and the priority of the one or more points, the cleaning plan including a specified actuation of each of a wiper and a fluid sprayer and a time duration of the specified actuations.

18. The method of claim 17, further comprising performing the segmentation of the sensor image data based on output of a neural network trained to detect a plurality of feature classes including at least an occlusion class.

19. The method of claim 17, further comprising:
determining the segmentation class of a location including one or more points on an exterior of the surface based on the sensor field of view, the vehicle route data, and the map data.

20. The method of claim 17, further comprising performing the selected cleaning plan.

* * * * *